US009481346B2

(12) United States Patent
Morselli et al.

(10) Patent No.: US 9,481,346 B2
(45) Date of Patent: Nov. 1, 2016

(54) METHOD OF AND APPARATUS FOR BRAKING A TRACTOR-TRAILER COMBINATION

(75) Inventors: Riccardo Morselli, San Vito di Spilamberto (IT); Francesco Canuto, Turin (IT); Pier Paolo Paravizzini, Rivalta di Torino (IT)

(73) Assignee: CNH Industrial America LLC, New Holland, PA (US)

( * ) Notice: Subject to any disclaimer, the term of this patent is extended or adjusted under 35 U.S.C. 154(b) by 190 days.

(21) Appl. No.: 14/126,042

(22) PCT Filed: Nov. 10, 2011

(86) PCT No.: PCT/EP2011/069877
§ 371 (c)(1),
(2), (4) Date: Mar. 26, 2014

(87) PCT Pub. No.: WO2013/004315
PCT Pub. Date: Jan. 10, 2013

(65) Prior Publication Data
US 2014/0343813 A1 Nov. 20, 2014

(30) Foreign Application Priority Data

Jul. 4, 2011 (IT) .............................. TO2011A0587

(51) Int. Cl.
*B60T 8/17* (2006.01)
*B60T 8/176* (2006.01)
(Continued)

(52) U.S. Cl.
CPC ............... *B60T 8/1708* (2013.01); *B60T 7/20* (2013.01); *B60T 8/176* (2013.01); *B60T 8/248* (2013.01);
(Continued)

(58) Field of Classification Search
CPC ........ B60T 8/1708; B60T 8/176; B60T 7/20; B60T 8/248; B60T 13/08; B60T 13/662; B60T 13/686; B62D 53/00
See application file for complete search history.

(56) References Cited

U.S. PATENT DOCUMENTS 5,108,158 A * 4/1992 Breen .................. B60T 8/1708
280/243
6,152,252 A * 11/2000 Pettersson .......... B60G 17/0162
180/282

(Continued)

FOREIGN PATENT DOCUMENTS

CN 101580059 A * 11/2009
CN 201685807 U * 12/2010

(Continued)

OTHER PUBLICATIONS

International PCT Search Report (5 Pages), Dated Jul. 3, 2012.

*Primary Examiner* — Tuan C. To
(74) *Attorney, Agent, or Firm* — Richard K. DeMille

(57) ABSTRACT

A method of controlling the braking of a tractor-trailer combination (10) in which the tractor (11) includes a drive train having an engine and at least one ground-engaging member (14, 16) driveably connected thereto via an adjustable-ratio transmission; at least one ground-engaging member (14, 16) of the tractor includes at least one tractor brake; and at least one ground-engaging member (17) of the trailer (12) includes at least one further, trailer brake, comprises the steps of determining (i) the deceleration of the tractor-trailer combination (10) resulting from braking effort applied via the tractor brake and/or (ii) the deceleration of the tractor-trailer combination resulting from engine braking. The method also includes establishing from one or both the said, determined decelerations as a target value in a control system a braking effort of the trailer brake that approximates the braking of the tractor-trailer combination (10) to the braking of the tractor (11) when considered alone.

15 Claims, 12 Drawing Sheets

(51) Int. Cl.
*B62D 53/00* (2006.01)
*B60T 8/24* (2006.01)
*B60T 7/20* (2006.01)
*B60T 13/08* (2006.01)
*B60T 13/66* (2006.01)
*B60T 13/68* (2006.01)

(52) U.S. Cl.
CPC .............. *B60T 13/08* (2013.01); *B60T 13/662* (2013.01); *B60T 13/686* (2013.01); *B62D 53/00* (2013.01); *B60T 2230/06* (2013.01)

(56) References Cited

U.S. PATENT DOCUMENTS

| | | | | |
|---|---|---|---|---|
| 7,134,733 B2* | 11/2006 | Eckert | ............... | B60T 13/683 |
| | | | | 303/123 |
| 7,413,266 B2* | 8/2008 | Lenz | ............... | B60T 8/248 |
| | | | | 303/150 |
| 7,497,529 B2* | 3/2009 | Lesesky | ............... | B60R 16/0315 |
| | | | | 303/123 |
| 8,322,965 B2* | 12/2012 | Smith | ............... | B60D 1/14 |
| | | | | 280/411.1 |
| 8,983,729 B2* | 3/2015 | Hahne | ............... | B60T 8/1708 |
| | | | | 701/42 |
| 2002/0147072 A1* | 10/2002 | Goodell | ............... | B60T 17/22 |
| | | | | 477/183 |
| 2003/0111894 A1* | 6/2003 | Wattenburg | ............... | B60R 25/00 |
| | | | | 303/7 |
| 2003/0232695 A1* | 12/2003 | Stummer | ............... | B62D 53/00 |
| | | | | 477/2 |
| 2005/0017577 A1* | 1/2005 | Eckert | ............... | B60T 13/683 |
| | | | | 303/123 |
| 2005/0146208 A1* | 7/2005 | Wattenburg | ............... | B60R 25/00 |
| | | | | 303/70 |
| 2006/0037787 A1* | 2/2006 | Hammonds | ............... | B62D 53/00 |
| | | | | 180/6.48 |
| 2007/0194556 A1* | 8/2007 | Kleysen | ............... | B62D 53/0814 |
| | | | | 280/476.1 |
| 2007/0205656 A1* | 9/2007 | Bitter | ............... | B60T 11/108 |
| | | | | 303/7 |
| 2010/0078962 A1* | 4/2010 | Kronenberg | ............... | B60D 1/58 |
| | | | | 296/180.2 |
| 2011/0022282 A1* | 1/2011 | Wu | ............... | B60D 1/245 |
| | | | | 701/70 |
| 2012/0041653 A1* | 2/2012 | Choby | ............... | B60T 7/20 |
| | | | | 701/51 |
| 2012/0130573 A1* | 5/2012 | Wu | ............... | B60T 8/1708 |
| | | | | 701/22 |
| 2013/0158801 A1* | 6/2013 | Tober | ............... | B60T 8/17551 |
| | | | | 701/41 |

FOREIGN PATENT DOCUMENTS

| | | |
|---|---|---|
| DE | 4243245 A1 | 6/1994 |
| DE | 4429231 C1 | 8/1995 |
| DE | 102009050793 A1 | 4/2011 |
| DE | 102009050793 A1 | 4/2011 |
| EP | 2269880 A1 | 1/2011 |
| EP | 2269880 A1 | 1/2011 |
| GB | 2282424 A | 4/1995 |
| GB | 2282424 A | 1/2013 |
| WO | WO 9836955 A1 | 8/1998 |
| WO | WO 9836955 A1 | 8/1998 |

* cited by examiner

METHOD OF AND APPARATUS FOR BRAKING A TRACTOR-TRAILER COMBINATION

The invention relates to a method of and apparatus for braking a tractor-trailer combination.

It is well known for agricultural and other tractors to tow trailing vehicles. Numerous examples exist in many branches of transportation technology. The invention is particularly applicable in the case of an agricultural tractor towing an un-powered trailer such as a grain or beet trailer, hay wagon, mower, forage harvester, baler or similar vehicle that requires the traction of the tractor to effect movement.

The invention is also applicable in other situations in which a trailer is towed. Examples include but are not limited to articulated goods vehicles; combinations of military tractors/cabs and towed vehicles; and two-vehicle forestry and snowmobile trains.

A further area in which the invention is useful is that of tractors the frames of which are articulated to provide a steering effect about a mid-point, with driven wheels or other ground-engaging members (such as powered tracks) attached to both front and rear articulating parts. Such vehicles are sometimes referred to as "bi-directional" tractors or articulated tractors. Relatively small, wheeled examples of such tractors are employed e.g. in grass cultivation work and forestry; and very large scale machines, sometimes including tracks as the ground-engaging members, are used on large farms.

When the tractor is fitted with four ground-engaging wheels (or other members such as tracks) the invention is useable regardless of whether all four, or just two, of the wheels (or tracks, if present) are driven by the tractor engine.

The foregoing vehicle combinations and types are referred to generally herein as "tractor-trailer combinations".

The phenomenon of jack-knifing can arise in use of a tractor-trailer combination. In this situation forces exerted forwardly by the trailer via the trailer hitch (i.e. the coupling to the tractor), or in the case of a 4WD tractor by the rear half of the articulated chassis via the steering articulation, can cause dangerous oversteer in the combination.

In an extreme case the forwardly exerted trailer force can exceed the grip of the ground-engaging members of the tractor, with the result that the tractor slews, possibly violently, in a skid situation. Even if no skidding occurs however the driver/operator of a tractor-trailer combination that undergoes jack-knifing may find that the combination becomes impossible to control.

The jack-knife situation therefore is usually extremely dangerous. Aside from the fact that the mass of the tractor-trailer combination (which may be several tens of tonnes in the case of a loaded agricultural trailer) moves uncontrolledly, perhaps at speeds of up to 30 km/h, there is also a danger of a rollover accident if any component of force generated by the trailer acts even for a short time in a direction tending to unlevel the tractor.

Tractor and trailer rollover accidents are often very serious. Even if a complete rollover does not occur during a jack-knife situation the contact area of the tyres of the driven wheels of the tractor may reduce, thereby adversely affecting the characteristics of the combination and for a further reason making it to harder to correct the jack-knife safely.

Jack-knifing is more likely during turning manoeuvres. This is partly because at such a time the line of application of any force exerted by the trailer through the trailer joint is not aligned with the longitudinal axis of the tractor, so a significant component of the forwardly acting force in effect exaggerates the turning moment acting on the tractor during the turn.

Also a tractor operator may have to concentrate on several variable factors while conducting a turn, and this may make him/her less alert to the possibility of a jack-knife occurring.

It is known to provide heavy trailers with brakes. Typically these are hydraulic, pneumatic or electric wheel braking systems the operation of which is linked to operation of the tractor brakes.

Although known trailer brakes assist the overall braking effort in a tractor-trailer combination they do not eliminate jack-knifing. Two types of dangerous situation in particular arise even when the trailer of a tractor-trailer combination is braked as described.

Firstly when a tractor operator applies the tractor brakes they may decelerate the tractor more aggressively than the trailer brakes decelerate the trailer. As a result the trailer exerts a forwardly acting (jack-knife inducing) force via the trailer hitch.

This particular mode of jack-knife initiation derives in part from the fact that the tractor operator tends to apply the tractor brakes without taking account of the effectiveness of the trailer brakes and the mass carried in the trailer. The trailer brake effort may represent a compromise approximating to the braking effort needed to slow a trailer that is filled with a certain average mass. If for any reason (such as an increased crop moisture content, or over-filling of the trailer) the trailer contents weigh more than the average mass the trailer brake performance may be inferior to that of the tractor brakes, leading to potential jack-knife accidents. The trailer brake performance may also be inferior to the tractor brake performance for the simple reason that the trailer performance is not correctly matched to that of the tractor; and if the tractor-trailer combination is travelling downhill this further applies a forwardly acting force via the trailer joint.

A second mode of jack-knife arises when the tractor operator releases the throttle pedal, hand throttle or other throttle/engine governor control used to regulate the speed of the tractor.

This leads to an engine braking effect, in which the torque of the engine develops as a turning moment at the driven wheels of the tractor that tends to slow the tractor-trailer combination as the engine speed drops.

This braking effect arises without any application of the tractor brakes taking place. It is particularly pronounced in an agricultural tractor because the large rotating masses of a tractor diesel engine can decelerate quickly when the throttle/governor control is released, and because the driven wheels of a conventional tractor are of large diameter, thereby giving rise to a large decelerating moment.

Moreover modern agricultural tractors commonly are fitted with continuously variable transmissions (CVT's) of (typically) the hydrostatic type. As the engine speed reduces as a result of throttle/governor control release the transmission ratio automatically decreases as well. This increases the mechanical advantage offered by the transmission, and has the effect of increasing the torque developed at the driven wheels of the tractor. This means that the engine braking effect is more severe than if the transmission ratio was fixed.

Operation of trailer brakes, if fitted, is usually initiated by the operation of the tractor brakes. Since as noted during engine braking the tractor brakes are not activated during the deceleration period resulting from throttle/governor release the engine braking effect brakes the tractor while the trailer remains completely un-braked so that its full inertial force acts forwardly via the hitch.

The combination of factors described makes potential jack-knife situations somewhat likely when using engine braking to brake a tractor-trailer combination. Again if the tractor-trailer combination is travelling downhill the effect may be worsened.

Moreover of course when a tractor operator applies the brakes of the vehicle the throttle/engine governor usually is released, giving rise to an engine braking effect in combination with the pedal braking effect.

The various described modes of jack-knifing inducement could arise when the tractor-trailer combination is travelling essentially in a straight line although as indicated jack-knifing is more likely when the tractor-trailer combination is turning.

In view of the foregoing there is a need to improve the braking of tractor-trailer combinations in order to eliminate or at least reduce the risk of jack-knifing.

According to the invention in a broad aspect there is provided a method of controlling the braking of a coupled tractor-trailer combination in which the tractor includes a drive train having an engine and at least one ground-engaging member driveably connected thereto via an adjustable-ratio transmission; at least one ground-engaging member of the tractor includes at least one tractor brake; and at least one ground-engaging member of the trailer includes at least one further, trailer brake, the method comprising the steps of determining a reference deceleration value $A_{X\_REF}$ derived from (I) the deceleration of the tractor, when considered alone, resulting from braking effort applied via the tractor brake and/or (ii) the deceleration of the tractor, when considered alone, resulting from engine braking; and using the reference value as a control input in an open-loop control to control the braking effort of the trailer brake so that the braking of the tractor-trailer combination approximates to the braking of the tractor when considered alone.

An advantage of the method is that by controlling the braking of the trailer in the manner described the trailer transmits no net force, during decelerations caused by operation of the tractor brake or by releasing of the throttle or governor control, via the trailer hitch. This means that the trailer does not cause jack-knife situations to arise, and instead effectively "brakes itself" in a manner that renders zero its apparent inertia as seen at the tractor.

The control arrangement described operates in an open-loop manner (i.e. with the target deceleration derived from the pedal braking effort and/or the engine braking effect fed forwardly in the control loop). This means that the control action is computationally straightforward to achieve at low cost. The control arrangement provides an effective solution to the jack-knifing problems described.

To this end preferably the method of the invention includes the steps of determining from is the reference deceleration value, in accordance with a predetermined relation, a target value of the braking effort of the trailer brake.

Preferably, as noted, the method includes the step of activating at least one said trailer brake in dependence on the target value. In practice however at least two wheels (or other ground-engaging members) of the trailer would be braked under the control provided by the method.

In line with the principles of the invention explained above, conveniently the reference value is calculated in accordance with the expression:

$$A_{X\_REF} = \frac{F_{TRACTOR\_BRAKES}}{M_{TRACTOR}}$$

wherein $A_{X\_REF}$ is the reference deceleration value; $F_{TRACTOR\_BRAKES}$ is the brake force generated by the tractor from the braking effort applied via the at least one tractor brake and/or by engine braking; and $M_{TRACTOR}$ is the mass of the tractor omitting the mass of the trailer.

Also preferably the target value is generated as a brake fluid pressure value; and the method includes inputting the target value into a control system controlling the pressure of fluid in the trailer brake valve and activating at least one said trailer brake in dependence on the target value, wherein the target value of the braking effort of the trailer brake is calculated based on an average value of fluid pressure in a circuit including at least one trailer brake.

For the avoidance of doubt it is here stated that optionally the average value of fluid pressure may be an average of a time-varying (e.g. regularly pulsing, irregularly pulsing or slowly time-varying) pressure value; or a time-invariant pressure value. Of course in the case of a fluid pressure value that is invariant over the time period during which sampling takes place the average fluid pressure value and the instantaneously prevailing value are the same.

Pulsing or other time variation of the fluid pressure value may be the result of e.g. operation of an antilock braking system, or other causes.

By "fluid" in this context is meant hydraulic fluid in a hydraulic braking system, air or another compressible gas in a pneumatic braking system, fluids in hybrid fluid-based braking circuits, and equivalent means. The invention is applicable equally to pneumatic braking arrangements as to hydraulic ones.

In more detail therefore the trailer brake preferably includes a trailer brake fluid line and the predetermined relation is a combination of:

(i) a function relating on the one hand the pressure of fluid in the tractor brake fluid line resulting from the application of the tractor brake and on the other hand the braking effort of the trailer brake; and (ii) a function relating on the one hand the braking effort resulting from engine braking and on the other hand the pressure of fluid in the trailer brake fluid line.

In particular when the tractor-trailer combination is braked through engine braking alone or a combination of engine braking and pedal braking one may consider the following expression:

$$A_{X\_EB} = \frac{F_{ENGINE\_BRAKES}}{M_{TRACTOR} + M_{TRAILER}},$$

in which $A_{X\_EB}$ is the deceleration due to engine braking effects; $F_{ENGINE\_BRAKES}$ represents the braking effort resulting from engine braking; $M_{TRACTOR}$ is the tractor mass and $M_{TRAILER}$ is the trailer mass. $A_{X\_EB}$ is less than the required reference deceleration $A_{X\_REF}$ unless the control described below is implemented.

Considering the application of the tractor brake, $$A_{X\_PB} = \frac{F_{PEDAL\_BRAKES} + F_{TRAILER\_BRAKES}}{M_{TRACTOR} + M_{TRAILER}}$$

In this expression $A_{X\_PB}$ additionally is the deceleration resulting from operation of the tractor brake(s); $F_{PEDAL\_BRAKES}$ is the braking effort of the tractor brake(s); and $F_{TRAILER\_BRAKES}$ is the deceleration resulting from activation of the trailer brake(s) simultaneously with application of the tractor brake(s). $A_{X\_PB}$ is more likely than $A_{X\_EB}$ to approximate to $A_{X\_REF}$ but for the reasons explained above this is not always the case.

In accordance with the open loop control approach of the invention:

$$A_{X\_EB\_OPEN\_LOOP} = \frac{F_{ENGINE\_BRAKES} + F_{TRAILER\_BRAKES\_OPEN\_LOOP}}{M_{TRACTOR} + M_{TRAILER}} \cong A_{X\_REF}$$

In this expression $A_{X\_EB\_OPEN\_LOOP}$ is the deceleration resulting from application of the control according to the invention. In this the trailer braking effort $F_{TRAILER\_BRAKES\_OPEN\_LOOP}$ represents a modified braking effort resulting from the generation of a fluid pressure in the trailer brake hydraulic line calculated such that $A_{X\_EB\_OPEN\_LOOP}$ is generally equal to $A_{X\_REF}$. This eliminates or significantly reduces the risk of jack-knifing occurring.

Conveniently when the reference braking effort value is determined from the deceleration of the tractor resulting from braking effort applied via the tractor brake the pressure of fluid in the trailer brake valve is controlled to be the prevailing maximum based on the difference between the reference braking effort value and the value of the braking effort applied via the tractor brake. Further conveniently the aforementioned steps terminate if the difference between the reference braking effort value and the value of the braking effort applied via the tractor brake is less than a chosen threshold value.

The method of the invention preferably includes the steps of measuring or sensing one or more of the following values and determining the reference value in dependence thereon:
 a. the torque developed by the engine;
 b. the prevailing ratio of the transmission;
 c. the steering angle, as defined herein, of the tractor;
 d. the slope on which the tractor-trailer combination moves; and
 e. the vehicle speed.

Such variables may in practical embodiments of the invention be measured using one or more of a range of sensing devices the nature and functioning of which will be known or will readily occur to the worker of skill in the art.

In one optional embodiment of the invention the transmission is a step ratio transmission. As set out herein however in the majority of cases the transmission is likely to be a continuously variable transmission. Advantages of this arrangement are described in further detail below.

Regardless of the exact transmission type embodied the reference braking effort value calculated during deceleration resulting from the braking effort applied via the tractor brake preferably is calculated at least in part in proportion to a measurable setting of the tractor brake.

In particular the tractor brake preferably includes at least one fluid line and the measurable setting of the tractor brake is or is proportional to the pressure of fluid in the line. However, other ways of measuring the applied tractor braking effort are within the scope of the invention. For example, a force transducer could measure the pressure applied to a brake pedal during braking; or an accelerometer could become activated when depression of a brake pedal closes a switch.

Preferably the reference value calculated during engine braking is calculated in proportion to the transmission ratio of the transmission and in proportion to the torque developed by the engine.

Optionally the method may include the step of measuring the inclination of the tractor-trailer combination using an inclinometer. In consequence a compensation signal could be input to the open-loop control by which the method proceeds, in order to take account of the slope of the ground on which the tractor-trailer combination moves during carrying out of the method. The compensation signal could for example cause the software to generate or access modified versions of the functions referred to above and relating the trailer brake fluid pressure to (i) the braking effort caused by operation of the trailer brake; and (ii) the braking effort resulting from engine braking.

Additionally or alternatively the method may include the step of determining the deceleration of the tractor-trailer combination resulting from braking effort applied via the tractor brake and/or the deceleration of the tractor-trailer combination resulting from engine braking using one or more of an accelerometer that measures deceleration of the tractor and/or a force transducer that measures forces in one or more of the drive train of the tractor or the connection between the tractor hitch and the trailer.

The method of the invention also preferably includes the steps of sensing a change in transmission ratio and using the change to initiate establishment of the reference value. This aspect of the method is particularly useful when the transmission is a CVT, such as but not limited to a hydrostatic transmission.

Optionally the deceleration of the tractor-trailer combination for a braking effort applied via the tractor brakes is less than when the same braking effort is applied via the tractor brakes in the absence of a trailer.

In a preferred embodiment of the invention the method includes calculation of the reference deceleration value $A_{X\_REF}$ in a form $A_{X\_REF\_COMP}$ that is a reference deceleration value compensated for the angle $\alpha$ of a slope on which the tractor-trailer combination operates, $A_{X\_REF\_COMP}$ being determined in accordance with the expression $$A_{X\_REF\_COMP} = \frac{F_{TRACTOR\_BRAKES}}{M_{TRACTOR}} + g\sin(\alpha)$$

in which additionally g is the value of acceleration due to gravity.

The invention also resides in apparatus, for carrying out a method as defined herein, comprising:
 a) tractor having a drive train including an engine and at least one ground-engaging member driveably connected thereto via an adjustable-ratio transmission, at least one ground-engaging member of the tractor including at least one tractor brake;
 b) a trailer having at least one ground-engaging member that includes at least one further, trailer brake;
 c) an activator for the at least one tractor brake;
 d) an activator for the at least one trailer brake;
 e) at least one sensor for sensing one or more variables giving rise to deceleration of the tractor-trailer combination resulting from braking effort applied via the tractor brake;

f) at least one sensor for sensing one or more variables giving rise to deceleration of the tractor-trailer combination resulting from engine braking; and g) at least one preferably programmable control device for establishing from the outputs of one or more said the said sensor devices a target value in a control system corresponding to a braking effort of the trailer brake that approximates the braking of the tractor-trailer combination to the braking of the tractor when considered alone, wherein the activator for the trailer brake is connected to operate in dependence on the target value.

Such apparatus preferably includes an open control loop to which the sensed values of the variables giving rise to deceleration of the tractor-trailer combination resulting from engine braking and/or pedal braking are input.

Moreover the control device in preferred embodiments of the invention is programmable and includes programmed therein a function that maps the target braking effort of the trailer brake to a value of brake fluid pressure in the activator for the at least one trailer brake.

Preferably the tractor brake and/or the trailer brake includes or is operatively connected to an antilock braking system (ABS).

Testing of a tractor-trailer combination that is arranged to operate in accordance with the method of the invention and/or that amounts to or includes apparatus in accordance with the invention has revealed significant performance improvements as a result of the invention.

In a low-traction test performed on a so-called "skid pan" (i.e. an experimental roadway exhibiting a low coefficient of friction with vehicle tyres) a tractor-trailer combination not in accordance with the invention when braked from moderate or high speeds showed a propensity to jack-knife, potentially dangerously. A comparable tractor-trailer combination in accordance with the invention however reliably pulled up safely and predictably with the tractor and trailer in line with one another and with no appreciable tendency towards jack-knifing.

Unexpectedly moreover a tractor-trailer combination according to the invention is characterised by more general improvements in braking performance.

In this regard in a high-traction test, in which the tractor-trailer combination is driven on a dry, generally flat road surface not constituted as a skid pan, the braking distance is significantly shortened through use of the invention.

In more detail, in a test a tractor-trailer combination in accordance with the invention stopped in a high-traction braking test in a distance that was virtually the same as that of a tractor on its own (not towing a trailer) when braked from the same speed on the same test roadway. A tractor-trailer combination not in accordance with the invention on the other hand when braked under identical circumstances required a braking distance several multiples of that required by the tractor-trailer combination according to the invention or a tractor driving alone.

In the tests the design, performance and condition of the tractor was the same in each case, except that in one set of measurements software implementing the method of the invention using apparatus as described herein was switched on before braking of the tractor-trailer combination occurred whereas it was switched off for the tests of the tractor on its own and of the tractor-trailer combination not in accordance with the invention.

In one test the braking distance required by the tractor-trailer combination not according to the invention was nearly three times that required by the tractor-trailer combination according to the Invention or a tractor on its own.

The improvement in braking distance performance provided by the invention is in no way suggested in the prior art.

All the advantages of the invention have been found to arise in respect of a very wide range of surfaces on which the tractor trailer combination may operate. These include but are not limited to tarmac, concrete, grass and gravel. The braking and anti-jacknife benefits furthermore are evident regardless of whether such surfaces are wet or dry, and regardless of whether they are flat, inclined uphill or inclined downhill with respect to the forward movement of the combination.

There now follows a description of preferred embodiments of the invention, by way of non-limiting example, with reference being made to the accompanying drawings in which.

Figure 5:
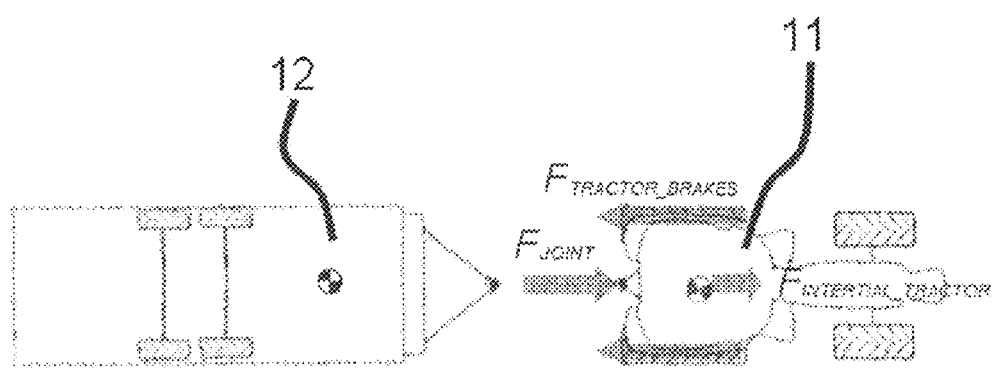
Figure 6:
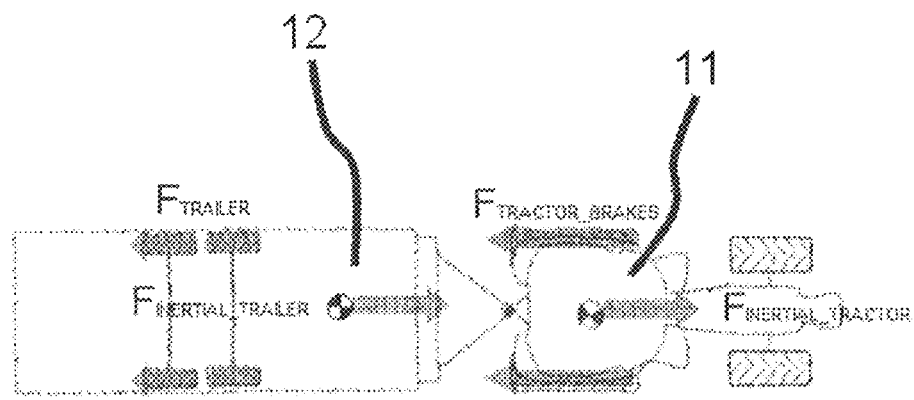
Figure 7:
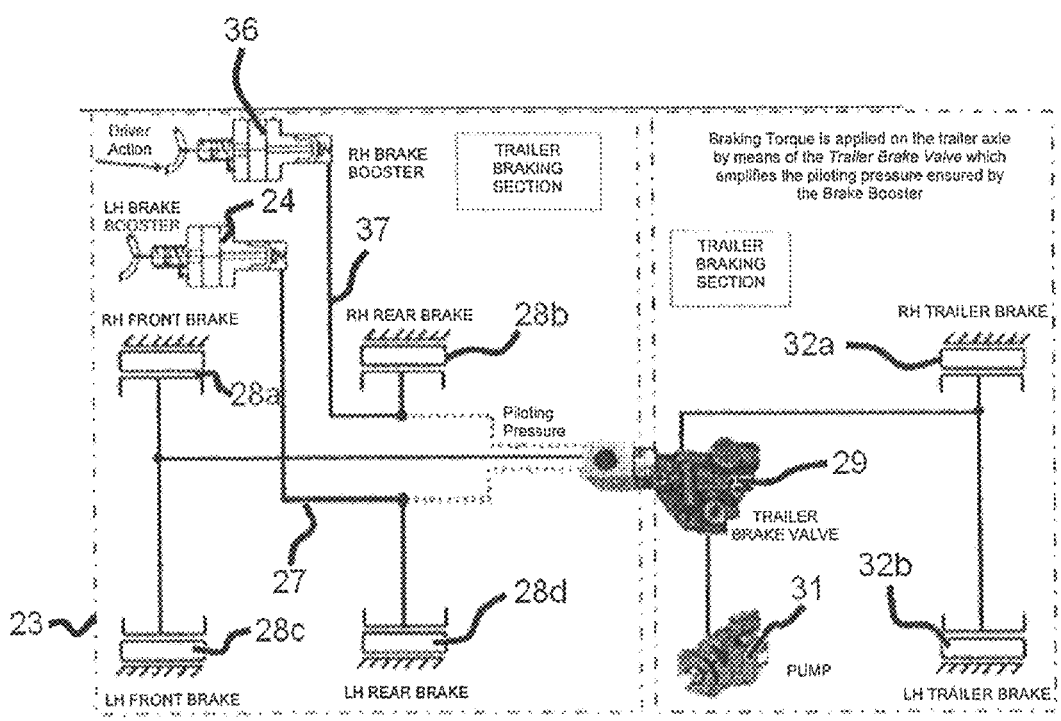
Figure 8:
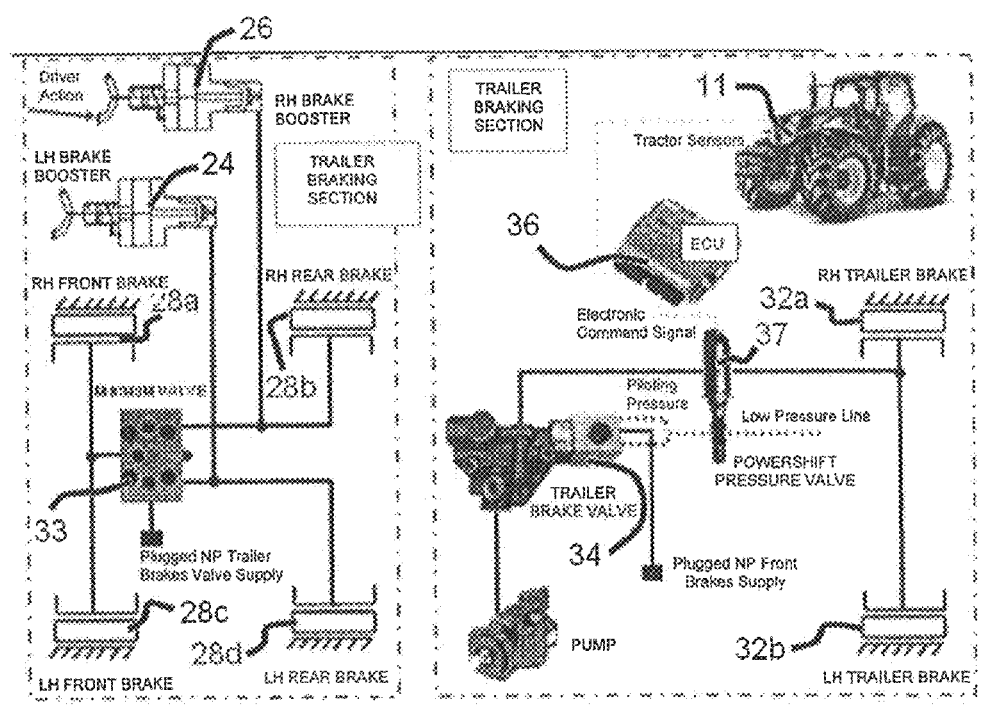
Figure 9:
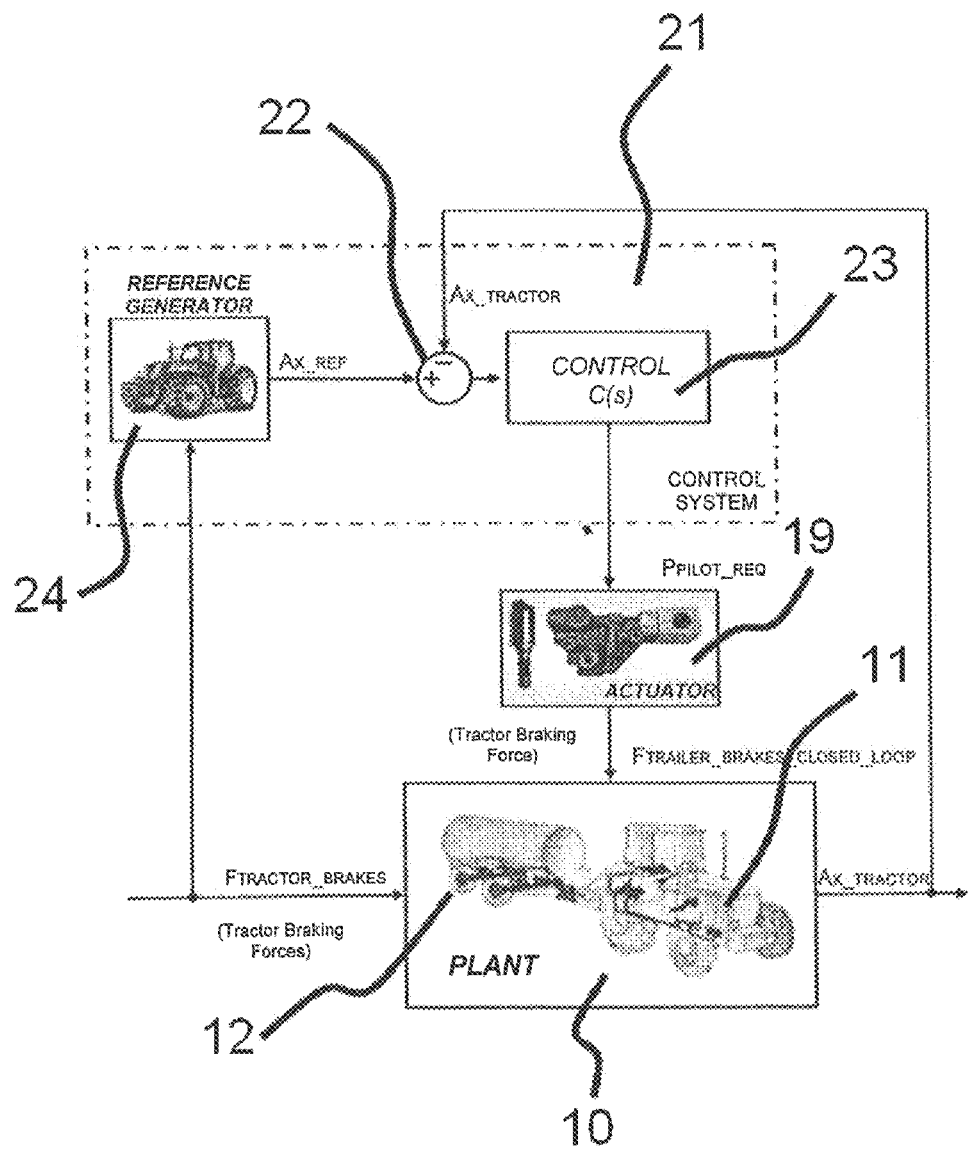
Figure 10:
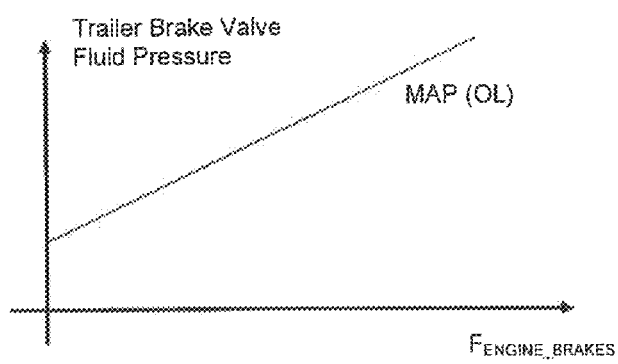
Figure 11A:
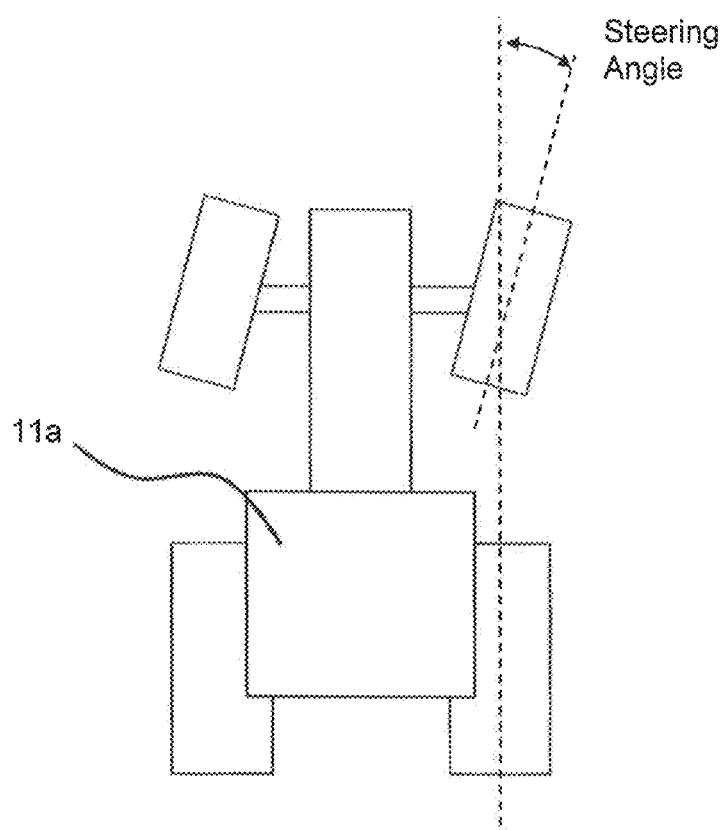
Figure 11B:
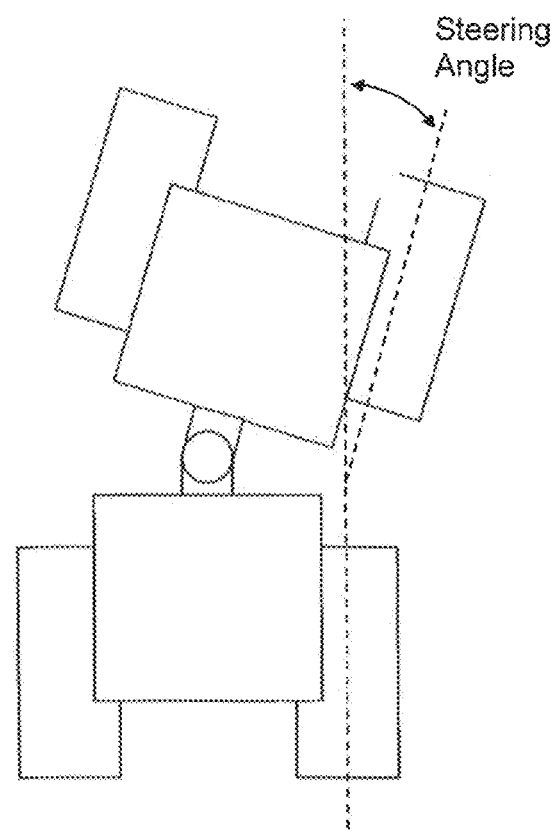

FIGS. 5 and 6 schematically show the derivation of a reference value, in accordance with the invention, from which a trailer braking effort may be derived that reduces or preferably eliminates the risk of jack-knifing occurring;

FIG. 7 shows in schematic form the interconnection of certain components a conventional apparatus for braking a tractor and trailer combination;

FIG. 8 shows in schematic form the interconnection of apparatus, in accordance with the invention, for performing a method in accordance with the invention;

FIG. 9 shows the control loop by which the method of the invention proceeds and according to which the apparatus of the invention operates;

FIG. 10 is a plot of an open loop map defining a relation between the fluid pressure in the trailer brakes circuit and the braking effort created by engine braking, that contributes to the control arrangement of the invention; and FIGS. 11a and 11b show schematically the definition of a measureable steering angle that in some embodiments of the invention is an input variable to the control system.

Figure 1:
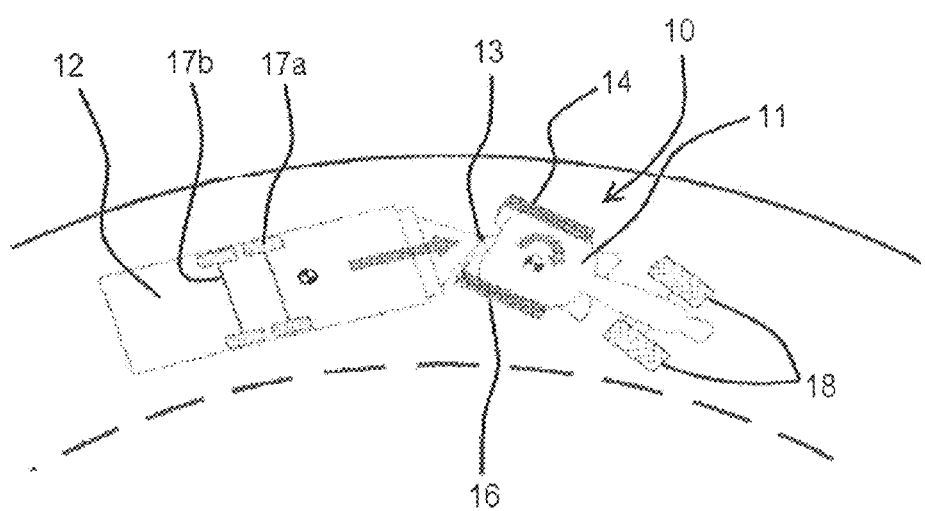
FIG. 1 is a schematic illustration showing some causes of jack-knifing in a prior art tractor-trailer combination.

Referring to the drawings, FIG. 1 illustrates the forces that may cause jack-knifing in a tractor-trailer combination 10.

In FIG. 1 a tractor 11 tows behind it a trailer 12 that is coupled to it by way of a tractor-trailer joint or connection 13. In FIG. 1 the tractor-trailer combination is shown turning on a roadway, but the invention is equally applicable when the combination is operating off-road and/or when travelling in a straight line.

In the example illustrated the tractor 11 is a two-wheel drive, wheeled tractor. As explained herein however the tractor 11 may take a range of other forms within the scope of the invention.

Similarly for purposes of illustrating the invention the trailer 12 is shown in FIG. 1 as a twin-axle trailer having at least one, and in the embodiment illustrated two, braked axles 17a, 17b in which the left and right ground-engaging wheels are capable of being braked; but other designs of towed vehicle may, within the scope of the invention, be substituted for the trailer 12 shown.

The connection 13 is a conventional trailer towing joint. This means that the coupling between the tractor 11 and trailer 12 is articulated to permit the combination 10 to turn as illustrated in FIG. 1; and that the coupling is relatively rigid in the fore- and aft-directions such that longitudinally acting forces between the trailer 12 and tractor 11 are transmitted without any appreciable attenuation.

In any situation therefore in which the tractor 11 decelerates more rapidly than the trailer 12 the mass $M_{TRAILER}$ of the trailer acts forwardly via the joint 13 and pushes the tractor 11 from behind with a force $F_{INERTIAL\_TRAILER}$. As shown by the large arrow in FIG. 1 when such a force acts in a direction that is not aligned with the longitudinal axis of the tractor 11 the latter receives an offset force, at the rear, tending to slew the rear of the tractor off-centre.

If as illustrated in FIG. 1 the steering wheels 18 of the tractor are turned, such forces exaggerate the steering of the tractor 11 such that oversteer occurs. The turning moment acting on the tractor as a result of these effects is represented schematically by the arcuate arrow in FIG. 1.

As explained above, under some circumstances the force $F_{INERTIAL\_TRAILER}$ is sufficient to overcome the grip of the rear, driven wheels 14, 16 of the tractor 11.

The reasons for potential jack-knifing include operation of the tractor brakes that causes more aggressive braking of the tractor 11 than the trailer 12; and releasing of the throttle/governor control, both as described above.

The coupling 13 experiences the pushing force generated by the trailer as $F_{JOINT}$. FIG. 5 shows the longitudinal force balance in the tractor 11, when towing the trailer 12.

In FIG. 5 in addition to the quantities mentioned above the forces $F_{INERTIAL\_TRACTOR}$ and $F_{TRACTOR\_BRAKES}$ are shown.

As its naming implies, $F_{INERTIAL\_TRACTOR}$ relates to the inertial force derived from motion of the mass of the tractor 11; and $F_{TRACTOR\_BRAKES}$ signifies the braking effect experienced at the driven wheels 16, 17. The braking effect could derive from activation of the tractor brakes; release of the throttle/governor control; or a combination of these two causes of braking effort.

The force balance equation during braking of the prior art tractor-trailer combination 10 of FIG. 5 is:

$$F_{TRACTOR\_BRAKES} = F_{INERTIAL\_TRACTOR} + F_{JOINT} = M_{TRACTOR} A_{X\_TRACTOR} + F_{JOINT} \quad (1)$$

in which $M_{TRACTOR}$ is the mass of the tractor 11 and $A_{X\_TRACTOR}$ is the deceleration of the tractor at a given instant.

From Equation 1 can be derived that:

$$A_{X\_TRACTOR} = \frac{F_{TRACTOR\_BRAKES} - F_{JOINT}}{M_{TRACTOR}} \quad (2)$$

Equation 2 shows that the tractor deceleration $A_{X\_TRACTOR}$ depends on the braking action $F_{TRACTOR\_BRAKES}$, the tractor mass $M_{TRACTOR}$ and the pushing force $F_{JOINT}$ at the joint 13. Thus the tractor brakes in the prior art method and apparatus must brake the tractor mass and must resist any component of force transmitted forwardly via the joint 13.

Since the braking effort $F_{TRACTOR\_BRAKES}$ BRAES can be measured during braking and the tractor mass $M_{TRACTOR}$ is known, the deceleration $A_{X\_TRACTOR}$ is an indirect measure of the force $F_{JOINT}$. It follows that by setting the deceleration of the tractor 10 to a value corresponding to the deceleration of the tractor mass when considered alone one may eliminate the effect of the trailer. The objective therefore of the method of the invention is to control the braking of the trailer so that the deceleration of the tractor is that of the tractor alone. This in turn means that no net force is transmitted forwardly via the hitch.

The general expression of the tractor deceleration is:

$$A_{X\_TRACTOR} = \frac{F_{TRACTOR\_BRAKES}}{M_{TRACTOR}} \quad (3)$$

It follows that one may, in accordance with the method of the invention, develop a reference deceleration value that equates to the desired tractor deceleration characteristic.

The reference deceleration value may be calculated as:

$$A_{X\_REF} = \frac{F_{TRACTOR\_BRAKES}}{M_{TRACTOR}} \quad (4)$$

When considering the tractor-trailer combination 10 as represented in FIG. 6 the following relation holds:

$$A_{X\_TRACTOR} = A_{X\_TRACTOR} = \frac{F_{TRACTOR\_BRAKES} + F_{TRAILER}}{M_{TRACTOR} + M_{TRAILER}} \quad (5)$$

The objective in control terms therefore is to set the deceleration $A_{X\_TRACTOR}$ of the tractor 11 (which as indicated equals the trailer deceleration) to be the same as the reference deceleration value $A_{X\_REF}$.

In other words a control loop in which $$A_{X\_TRACTOR} = \frac{F_{TRACTOR\_BRAKES} + F_{TRAILER}}{M_{TRACTOR} + M_{TRAILER}} \cong A_{X\_REF} \quad (6)$$

will result in the desired control of the trailer braking that eliminates or significantly reduces the risk of jack-knifing.

From these considerations one may derive the braking effort $F_{TRAILER\_BRAKES\_OPEN\_LOOP}$ required at the trailer brakes to achieve the desired deceleration as:

$$F_{TRAILER\_BREAKS\_OPEN\_LOOP} = \quad (7)$$
$$\frac{F_{ENGINE\_BRAKES} + F_{TRAILER\_BRAKES\_OPEN\_LOOP}}{M_{TRACTOR} + M_{TRAILER}} \cong A_{X\_REF}$$

The value of $F_{TRAILER\_BRAKES\_OPEN\_LOOP}$ may be input as an open-loop control command to a brake circuit acting on the trailer axles 17a, 17b in order to eliminate the jack-knifing risk.

As shown by the schematic model that is FIG. 9 the required braking effort $F_{TRACTOR\_BRAKES\_OPEN\_LOOP}$ can be generated in a device 23 such as an Op-Amp, from a comparison in a comparator 22 of the reference deceleration value $A_{X\_REF}$ and the actual (measured or calculated) deceleration $A_{X\_TRACTOR}$ of the coupled tractor-trailer combination.

Apparatus for implementing the method of the invention is described in more detail below, but it is desirable to study FIG. 9 at this stage in order to understand one way (of several possible ways) of implementing the invention.

Figure 2:
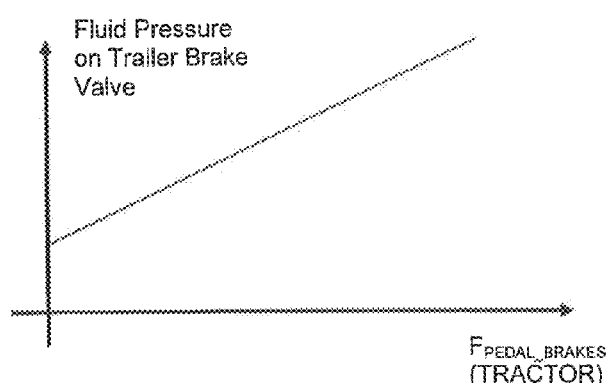
FIG. 2 is a plot of conventional values of fluid pressure in the circuit controlling the trailer brakes, against the braking effort applied via the tractor brakes.

The device 23 derives the signal $F_{TRAILER\_BRAKES\_OPEN\_LOOP}$ from a combination of maps of the responses of the system, as discussed further in the following:

In FIG. 2 the fluid pressure acting on the trailer brake valve (labelled 19 in FIG. 6) while the control of the invention is operational is plotted against the tractor pedal brake effort $F_{PEDAL\_BRAKES}$. FIG. 2 shows a proportional relation between the effort applied by the tractor brakes and the trailer brakes fluid pressure. Some pressure acts in the trailer brake valve circuit even if the tractor brakes are deactivated.

Figure 3:
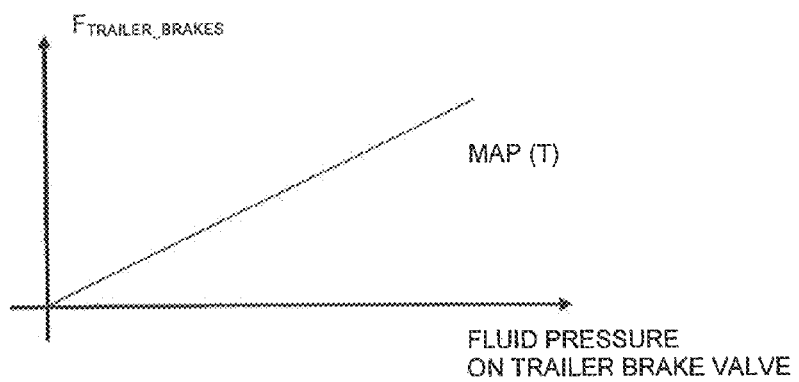
FIG. 3 is a plot of the relationship between the braking effort applied via the trailer brakes against the fluid pressure in the trailer brake valve circuit (i.e. the y-axis from FIG. 2)

FIG. 3 shows the proportional relationship between the fluid pressure acting on the trailer brake valve (x axis, in FIG. 3) and the braking effort $F_{TRAILER\_BRAKES}$ generated in the trailer braking hardware. FIG. 3 amounts to a map (MAP(T)) of the trailer braking effort derived from the trailer braking system fluid pressure.

Figure 4:
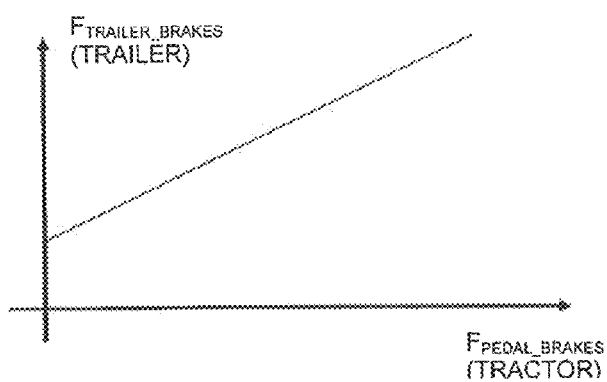
FIG. 4 is a combination of FIGS. 2 and 3 thereby showing the relationship between the braking effort developed by the tractor brakes (x-axis) and the braking effort developed by the trailer brakes when the tractor brakes are applied (y-axis)

FIG. 4 represents a combination of FIGS. 2 and 3, and therefore shows the relation between the quantities $F_{PEDAL\_BRAKES}$ (as defined above) and $F_{TRAILER\_BRAKES}$.

FIGS. 2, 3 and 4 are pictorial representations of data that may be stored, calculated or otherwise produced in a microprocessor 21 in which in the preferred embodiment of the invention the device 23 is incorporated. The electronic control components shown inside the structure of microprocessor 21 in FIG. 6 however could if desired be constituted separately and distributed at spaced locations in the tractor-trailer combination.

FIG. 10 shows a plot that is similar to FIG. 4 except that the x-axis plots the braking effort $F_{ENGINE\_BRAKES}$ resulting from any engine braking effect against the trailer brake valve fluid pressure (y-axis). FIG. 10, that also is generated or stored in microprocessor 21, amounts to an open-loop map (MAP(OL)) that may be combined with the map MAP(T) of FIG. 3 in order to generate the value of $F_{TRAILER\_BRAKES\_OPEN\_LOOP}$ in the device 23.

The steps described so far therefore amount to determination of a reference braking effort value derived from (i) the deceleration of the tractor-trailer combination resulting from braking effort applied via the tractor brake and/or (ii) the deceleration of the tractor-trailer combination resulting from engine braking; and establishing from reference braking effort value a target value in a control system a braking effort of the trailer brake that approximates the braking of the tractor-trailer combination to the braking of the tractor when considered alone; and also the provision of the control signal $F_{TRAILER\_BRAKES\_OPEN\_LOOP}$ required for activation of the trailer brakes to achieve the desired effect in reducing the risk of jack-knifing.

$F_{TRAILER\_BRAKES\_OPEN\_LOOP}$ can be obtained by applying an average value of fluid pressure as represented by FIG. 10. In reality the pilot valve pressure may be pulsing (i.e. time varying). Its average value corresponds to the straight line map of FIG. 10 even in the case of a pulsing pressure value.

As indicated, the deceleration of the tractor 11 resulting from activation of the trailer brake may be measured for example by sensing the pressure of hydraulic fluid in the tractor brake circuit and generating a voltage proportional thereto.

The deceleration resulting from release of a throttle or governor control may be calculated from the instantaneously prevailing transmission ratio together with the radius of the tractor driven wheels 17a, 17b that gives rise to a braking torque value.

Since from Equation 4 it is known that the reference tractor deceleration is represented by the braking effort at the tractor brakes divided by the tractor mass, and neglecting rotational inertias of engine components and tyre slip at the driven wheels 17a, 17b, the following relation holds:

$$A_{X\_REF} = \frac{F_{BRAKES}}{M_{TRACTOR}} = \frac{C_{ENG}\tau_{TRANS}}{M_{TRACTOR}R_{TRACT\_WHEEL}} \quad (8)$$

In Equation 8 $C_{ENG}$ is the torque developed by the engine; $\tau_{TRANS}$ is the prevailing transmission ratio; and $R_{TRACT\_WHEEL}$ is the radius of the driven wheels 17a, 17b of the tractor 11.

Various forms of CVT can produce voltage signals that are proportional to the prevailing transmission ratio. One particularly suitable type is the CNH Powershift transmission series, in which a microprocessor (electronic control unit or ECU) controls the prevailing transmission ratio. The signals generated in the microprocessor can be used directly to derive the transmission ratio voltage since these are transmitted via the vehicle CAN-BUS.

The engine torque similarly can be directly measured and in many tractor designs sensors are included for this purpose. The driven wheel radius is known and is assumed to be a constant in the generation of the reference value.

As alternatives to the foregoing methods of calculating the tractor deceleration however it is possible for example to sense the force $F_{JOINT}$ acting via the connection 13 between the tractor and the trailer. This may be achieved for example through the use of a load cell or other force-sensing transducer.

Similarly in an articulated tractor it is possible to sense forces acting via the articulation (steering) cylinders and thereby derive the signals needed to generate the trailer braking effort target signal, or as described below in relation to a non-articulated tractor.

In this regard one may define the steering angle of the front wheels of a non-articulated tractor 11a in accordance with the angle "Steering Angle" visible in FIG. 11a; and in an articulated tractor 11b in accordance with "Steering Angle" as illustrated in FIG. 11b. Any of a range of sensor types may be used to generate a signal (that typically is an electrical signal but need not necessarily be so) that is indicative of the steering angle.

In one embodiment of the invention the sensing of a change in transmission ratio at a time of no activation of the throttle or governor control could be used to initiate cycling of the control loop described above.

As indicated above, the control loop of the invention is summarised in FIG. 9.

In FIG. 9 are shown the tractor-trailer combination 10, the brake actuator valve 19 of the trailer brakes and a microprocessor 21 connected as illustrated.

The microprocessor 21 includes a summing junction or comparator 22 at which the tractor deceleration value $A_{X\_TRACTOR}$ and the reference value $A_{X\_REF}$ are subtracted one from the other to generate a difference signal that an amplifier 23 (such as but not limited to an OpAmp or similar device) having a gain C(s) generates as an output voltage $P_{PILOT\_REQ}$. This is input as a command voltage to the trailer brake valve 19, resulting in the generation of the trailer braking target value $F_{TRAILER\_BRAKES\_OPEN\_LOOP}$.

The microprocessor 21 includes a reference generator 24 to which the tractor braking effort $F_{TRACTOR\_BRAKES}$ (that as indicated preferably is measured as the pressure in the hydraulic brake line of the tractor 11) is input. From this the reference generator 24 develops $A_{X\_REF}$ as signified in FIG. 9.

The mass of a tractor is variable, depending on the use to which the tractor is put. When towing however at least one source of mass variation, namely the three point hitch from which an implement is supported, is not available for use. Therefore the only possible mass variations result from the addition of a weight pack or similar ballast at the front of the vehicle 11 and the masses of liquids (such as fuel) carried by the tractor frame. The variability of these masses compared with the overall mass of the tractor is not great. Therefore the tractor mass may be assumed to be constant.

In addition to the foregoing factors it is possible and may be desirable to measure (e.g. using an inclinometer) the slope of the ground on which the tractor moves. This could be used as a multiplication factor of the hitch force $F_{JOINT}$ in order to eliminate the effects of non-flat ground on the pushing force experienced at the connection or joint 13.

As stated herein additionally or alternatively the forward velocity of the tractor-trailer combination, or another speed-related measure, may be used as a variable that is input to the control system for the purpose of developing the instantaneously prevailing value of $A_{X\_REF}$.

FIGS. 7 and 8 show in schematic form a comparison between a prior art apparatus (FIG. 7) for braking a tractor-trailer combination 10; and an example of apparatus according to the invention (FIG. 8).

In FIG. 7 hydraulic pressure in the tractor brake circuit 23 is generated by the left and right brake pedals and associated brake boosters 24, 26 in hydraulic lines 27.

The hydraulic pressure activates the tractor brakes 28a, 28b, 28c, 28d. On activation of the brakes 28 the hydraulic pressure is piloted to the trailer brake valve 29. This causes hydraulic fluid pressurised by trailer brake pump 31 to operate the trailer brakes 32a, 32b. As explained this type of braking system is prone to causing jack-knifing.

In FIG. 8 the braking arrangement differs in that the hydraulic pressure in the lines 27 is sensed as described herein and used to develop the reference value and target value of the trailer braking effort. A plugged manifold 33 may generate a pressure signal that is input to the ECU of the trailer brake valve 34 that in the embodiment shown contains the microprocessor 21 illustrated in FIG. 9.

The ECU of brake valve 34 also receives as inputs signals from the engine ECU 36 of the tractor 11 and from the shift valve or equivalent component of the CVT of the tractor 11. In consequence the ECU of the trailer brake valve 34 may determine the braking effort value $F_{TRAILER\_BRAKES\_OPEN\_LOOP}$ from the settings of the tractor giving rise to deceleration caused by (a) activation of the tractor brakes 28a-28d and/or (b) throttle/governor lift-off, as described. This braking effort value is employed in the open loop control arrangement described in order to generate the target trailer braking effort value that minimises the risk of jack-knifing. Direct piloting of the tractor brakes hydraulic pressure to the trailer braking circuit does not occur.

Overall the method and apparatus of the invention confer considerable safety improvements compared with the prior art.

In further, optional refinements of the method and apparatus of the invention the control may be such (and the programmable device programmed such) that the prevailing difference between the target trailer braking effort and any braking effort resulting from use of the tractor brake(s) is calculated. The method and apparatus then can be arranged so that a maximal braking effort is applied via the trailer brakes (eg. as represented by a "fully open" condition of a trailer hydraulic or pneumatic brake valve) while this difference exceeds a threshold level. The threshold level may be pre-programmed or may be calculated in dependence on a variable value such as a measured slope on which the tractor-trailer combination s moving.

If the difference value drops below the threshold value (signifying a low risk of jack-knifing) the control action could be arranged to cease.

The apparatus and method optionally also could be arranged so that the deceleration of the tractor-trailer combination is less than that of the tractor when considered alone. This safety feature could further reduce the risk of jack-knifing by reducing the overall "aggressiveness" of the braking effort of the combination.

A further, optional refinement of the invention relates to operation of the tractor-trailer combination on a slope, and especially when travelling forwardly down the slope.

Under such circumstances it may be desirable to compensate the calculation of $A_{X\text{-}REF}$ to take account of the slope angle α, through use of the modified expression $$A_{X\_REF\_COMP} = \frac{F_{TRACTOR\_BRAKES}}{M_{TRACTOR}} + g\sin(\alpha) \tag{11}$$

in which $A_{X\_REF\_COMP}$ is the compensated version of $A_{X\_REF}$; α as stated is the slope angle and g is the acceleration due to gravity.

The value of α can be measured using an inclinometer fitted to the tractor. The inclinometer could be used to determine whether Equation (7) or Equation (9) herein is used to calculate the reference deceleration value, depending for example on whether the inclinometer output voltage exceeds a chosen threshold.

For the avoidance of doubt all references to $A_{X\_REF}$ herein may, within the scope of the invention, be replaced by $A_{X\_REF\_COMP}$ calculated in accordance with Equation (11), when considering movement down a slope. In other words the control of the invention may as desired be "switchable" to select $A_{X\_REF}$ or $A_{X\_REF\_COMP}$ as the target value of $A_{X\_MEASURED}$, depending on whether the tractor is on a slope or on level ground.

In practice the generation of $A_{X\_REF\_COMP}$ may be implemented by modifying the maps of FIGS. 2, 3, 4 and 10. The modified maps may be generated in real time when the inclinometer output signal indicates that a slope compensation is needed; or in the alternative modified versions of the maps corresponding to incremental slope inclination values can be stored e.g. in a memory associated with ECU 36 and called as necessary in dependence on the inclinometer voltage output.

Many tractors and other vehicles routinely are fitted with antilock braking (ABS) systems. The invention includes within its scope the operation of the method defined herein in combination with the operational steps of an ABS; and the inclusion of ABS components in or their operational connection to apparatus as defined herein. One example of many kinds of ABS that could be used in conjunction with the method and apparatus of the invention is described in WO2009/103645 A1. The entire disclosure of this document is incorporated herein by reference.

Furthermore for the avoidance of doubt although in preferred embodiments of the invention the various other signals mentioned herein are electrical signals, other signal types (such as but not limited to hydraulic or pneumatic pressure signals) are possible within the scope of the invention.

The listing or discussion of an apparently prior-published document in this specification should not necessarily be taken as an acknowledgement that the document is part of the state of the art or is common general knowledge.

The invention claimed is:

1. A method of controlling the braking of a coupled tractor-trailer combination in which the tractor includes a drive train having an engine and at least one ground-engaging member driveably connected thereto via an adjustable-ratio transmission; at least one ground-engaging member of the tractor includes at least one tractor brake; and at least one ground-engaging member of the trailer includes at least one further, trailer brake, the method comprising:

determining a reference deceleration value AX_REF derived from (i) the deceleration of the tractor, when considered alone, resulting from braking effort applied via the tractor brake and/or (ii) the deceleration of the tractor, when considered alone, resulting from engine braking;

determining from the reference deceleration value, in accordance with a predetermined relation, a target value of the braking effort of the trailer brake, wherein the reference deceleration value is calculated in accordance with the expression $$A_{X\_REF} = \frac{F_{TRACTOR\_BRAKES}}{M_{TRACTOR}}$$

wherein AX_REF is the reference deceleration value; $F_{TRACTOR\_BRAKES}$ is the brake force generated by the tractor from the braking effort applied via the at least one tractor brake and/or by engine braking; and $M_{TRACTOR}$ is the mass of the tractor omitting the mass of the trailer; and using the reference value as a control input in an open-loop contralto control the braking effort of the trailer brake so that the braking of the tractor-trailer combination approximates to the braking of the tractor when considered alone.

2. A method according to claim 1, wherein the target value of the braking effort of the trailer brake is $F_{TRACTOR\_BRAKES\_OPEN\_LOOP}$ and is related to the reference deceleration value AX_REF by the expression:

$$A_{X\_EB\_OPEN\_LOOP} = \frac{F_{ENGINE\_BRAKES} + F_{TRAILER\_BRAKES\_OPEN\_LOOP}}{M_{TRACTOR} + M_{TRAILER}} \cong A_{X\_REF}$$

in which additionally:

$A_{X\_EB\_OPEN\_LOOP}$ is the deceleration of the tractor-trailer combination resulting from activation of at least one said trailer brake in dependence on the said target value; $F_{ENGINE\_BRAKES}$ is the braking effort resulting from engine braking; and $M_{TRAILER}$ is the mass of the trailer forming part of the combination.

3. A method according to claim 1 wherein the target value is generated as a fluid pressure value, wherein the method includes inputting the target value into a control system controlling the pressure of fluid in the trailer brake valve and activating at least one said trailer brake in dependence on the target value; and wherein the target value of the braking effort of the trailer brake(s) is calculated based on an average value of fluid pressure in a circuit including at least one trailer brake.

4. A method according to claim 3 wherein the average value of fluid pressure is an average of a time-varying pressure value or a time-invariant pressure value.

5. A method according to claim 1 wherein the trailer brake includes a trailer brake fluid line and the predetermined relation is a combination of:

(i) a function relating on the one hand the pressure of fluid in the tractor brake fluid line resulting from the application of the tractor brake and on the other hand the braking effort of the trailer brake; and (ii) a function relating on the one hand the braking effort resulting from engine braking and on the other hand the pressure of fluid in the trailer brake fluid line.

6. A method according to claim 3, wherein when the reference deceleration value is determined from the deceleration of the tractor resulting from braking effort applied via the tractor brake the pressure of fluid in the trailer brake valve is controlled to be the prevailing maximum based on the difference between the reference braking effort value and the value of the braking effort applied via the tractor brake, the said controlling terminating if the difference between the reference braking effort value and the value of the braking effort applied via the tractor brake is less than a chosen threshold value.

7. A method according to claim 1 including the steps of measuring or sensing one or more of the following values and determining the reference value dependence thereon:
a) the torque developed by the engine;
b) the prevailing ratio of the transmission;
c) the steering angle, as defined herein, of the tractor;
d) the slope on which the tractor-trailer combination moves; and
e) the vehicle speed.

8. A method according to claim 1 wherein the transmission is a step ratio transmission or wherein the transmission is a continuously variable transmission.

9. A method according to claim 1 including calculation of the reference deceleration value AX_REF in a form $A_{X\_REF\_COMP}$ that is a reference deceleration value compensated for the angle α of a slope on which the tractor-trailer combination operates, $A_{X\_REF\_COMP}$ being determined in accordance with the expression $$A_{X\_REF\_COMP} = \frac{F_{TRACTOR\_BRAKES}}{M_{TRACTOR}} + g\sin(\alpha)$$

in which additionally g is the value of acceleration due to gravity.

10. A method of controlling the braking of a coupled tractor-trailer combination in which the tractor includes a drive train having an engine and at least one ground-engaging member driveably connected thereto via an adjustable-ratio transmission; at least one ground-engaging member of the tractor includes at least one tractor brake; and at least one ground-engaging member of the trailer includes at least one further, trailer brake, the method comprising:

determining a reference deceleration value AX_REF derived from (i) the deceleration of the tractor, when considered alone, resulting from braking effort applied via the tractor brake and/or (ii) the deceleration of the tractor, when considered alone, resulting from engine braking;

using the reference value as a control input in an open-loop control to control the braking effort of the trailer brake so that the braking of the tractor-trailer combination approximates to the braking of the tractor when considered alone;

wherein the reference deceleration value calculated during deceleration resulting from the braking effort applied via the tractor brake is calculated at least in part in proportion to a measurable setting of the tractor brake; wherein the tractor brake includes at least one fluid line; and wherein the measurable setting of the tractor brake is or is proportional to the pressure of fluid in the fluid line.

11. A method according to claim 10 wherein the reference deceleration value calculated during engine braking is calculated in proportion to the transmission ratio of the transmission and in proportion to the torque developed by the engine.

12. A method according to claim 10 including the step of determining the deceleration of the tractor-trailer combination resulting from braking effort applied via the tractor brake and/or the deceleration of the tractor-trailer combination resulting from engine braking using one or more of an accelerometer that measures deceleration of the tractor and/or a force transducer that measures forces in one or more of the drive train of the tractor and/or the connection between the tractor and trailer of the combination, and/or a sensor sensing a change in the ratio of the transmission.

13. A method according to claim 10 wherein the deceleration of the tractor-trailer combination for a braking effort applied via the tractor brakes is less than when the same braking effort is applied via the tractor brakes in the absence of a trailer.

14. An apparatus, comprising:
a) a tractor having a drive train including an engine and at least one ground-engaging member driveably connected thereto via an adjustable-ratio transmission, at least one ground-engaging member of the tractor including at least one tractor brake;
b) a trailer having at least one ground-engaging member that includes at least one further, trailer brake;
c) an activator for the at least one tractor brake;
d) at least one sensor for sensing one or more variables giving rise to deceleration of the tractor-trailer combination resulting from braking effort applied via the tractor brake;
e) at least one sensor for sensing one or more variables giving rise to deceleration of the tractor-trailer combination resulting from engine braking;
f) an open control loop to which the sensed values of the variables giving rise to deceleration of the tractor-trailer combination resulting from engine braking and/or pedal braking are input; and
g) at least one preferably programmable control device for establishing from the outputs of one or more said the said sensor devices a target value in a control system corresponding to a braking effort of the trailer brake that approximates the braking of the tractor-trailer combination to the braking of the tractor when considered alone, wherein the activator for the trailer brake is connected to operate in dependence on the target value.

15. An apparatus, comprising:
a) a tractor having a drive train including an engine and at least one ground-engaging member driveably connected thereto via an adjustable-ratio transmission, at least one ground-engaging member of the tractor including at least one tractor brake;
b) a trailer having at least one ground-engaging member that includes at least one further, trailer brake;
c) an activator for the at least one tractor brake;
d) at least one sensor for sensing one or more variables giving rise to deceleration of the tractor-trailer combination resulting from braking effort applied via the tractor brake;
e) at least one sensor for sensing one or more variables giving rise to deceleration of the tractor-trailer combination resulting from engine braking; and
g) at least one preferably programmable control device for establishing from the outputs of one or more said the said sensor devices a target value in a control system corresponding to a braking effort of the trailer brake that approximates the braking of the tractor-trailer combination to the braking of the tractor when considered alone, wherein the activator for the trailer brake is connected to operate in dependence on the target value, wherein the control device is programmable and includes programmed therein a function that maps the target braking effort of the trailer brake to a value of brake fluid pressure in the activator for the at least one trailer brake.

* * * * *